United States Patent [19]

Dooley et al.

[11] 3,986,605

[45] Oct. 19, 1976

[54] MONITOR CAR TRANSPORTATION AND STORAGE CONVEYOR SYSTEM

[75] Inventors: Ray A. Dooley, Rustburg; Frank R. Wood, Lynch Station, both of Va.

[73] Assignee: Automated Conveyor Systems, Inc., Lynchburg, Va.

[22] Filed: Mar. 2, 1976

[21] Appl. No.: 663,292

[52] U.S. Cl. .............................. 198/746; 198/747
[51] Int. Cl.² ................................... B65G 25/08
[58] Field of Search .......... 198/106, 160, 170, 218, 198/221, 222; 104/162, 172 B, 172 BT

[56] References Cited
UNITED STATES PATENTS

| | | | |
|---|---|---|---|
| 3,568,818 | 3/1971 | Hanson | 198/218 |
| 3,568,825 | 3/1971 | Munger | 198/221 |
| 3,712,460 | 1/1973 | Kitajima | 198/221 |
| 3,744,621 | 7/1973 | Adams et al. | 198/221 |
| 3,768,629 | 10/1973 | Bennett et al. | 198/221 |
| 3,799,327 | 3/1974 | Schulz | 198/170 |
| 3,807,550 | 4/1974 | Taylor | 198/221 |
| 3,894,629 | 7/1975 | Wakabayashi | 104/172 B |

*Primary Examiner*—Johnny D. Cherry
*Assistant Examiner*—Joseph E. Valenza
*Attorney, Agent, or Firm*—Mason, Fenwick & Lawrence

[57] ABSTRACT

An accumulating conveyor system for transporting and storing plural loads, formed of a pair of laterally spaced parallel lines of non-powered rollers and an intervening load advancing car reciprocative along advance and return strokes between the ends of the roller lines. The load advancing car has a load advancing friction pad movable vertically from a raised load engaging position to a retracted inactive position under control of a monitor wheel which also moves vertically, to retract the pad from load engaging position responsive to contact of the wheel with loads along the lines of rollers.

14 Claims, 10 Drawing Figures

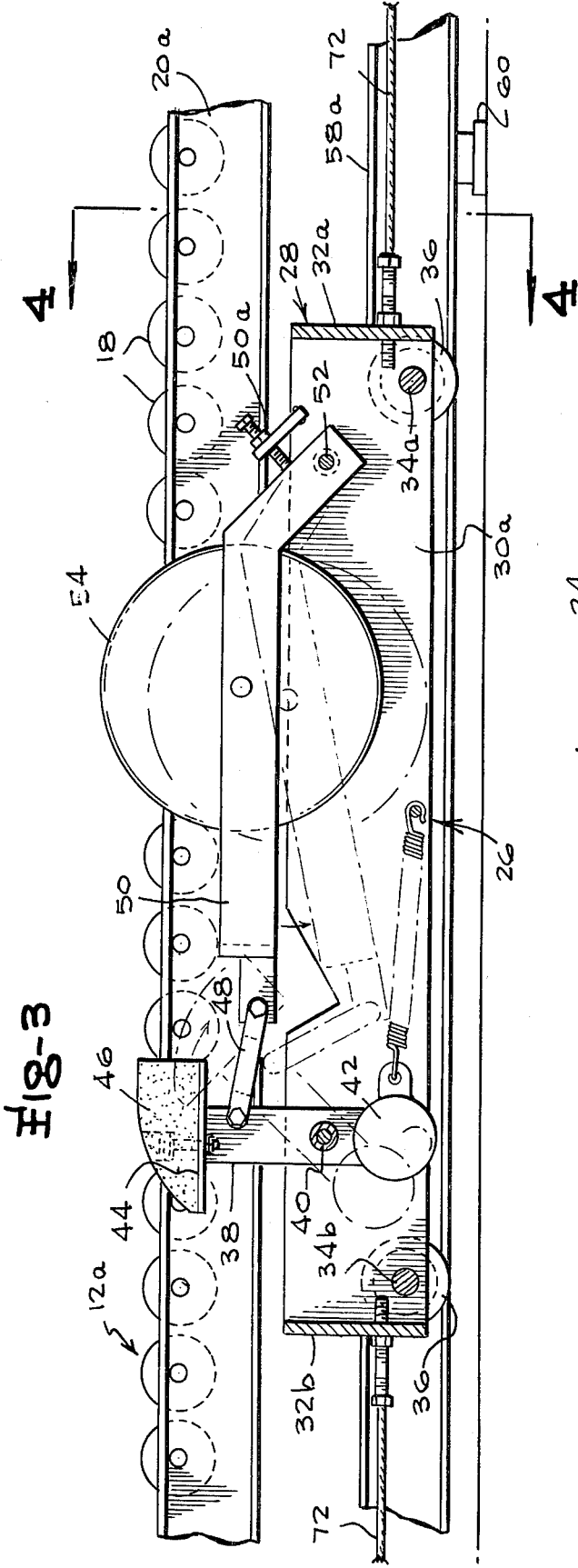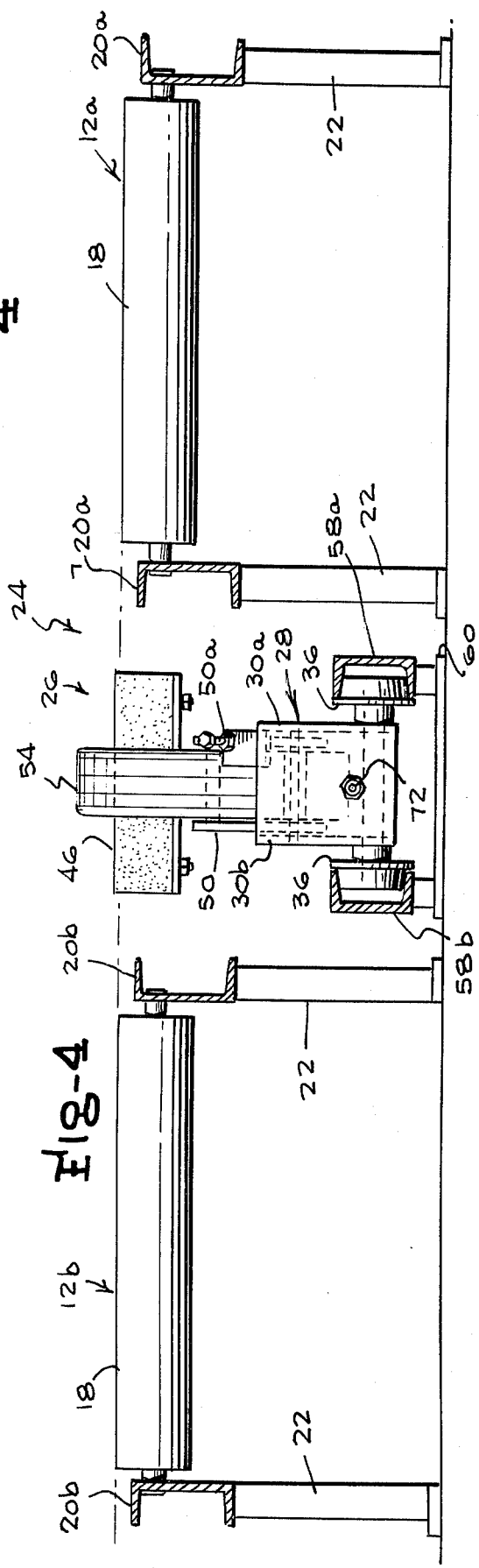

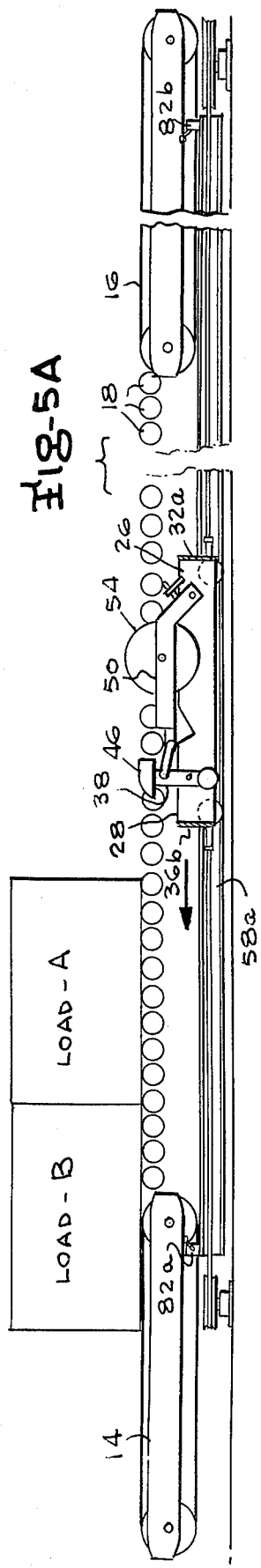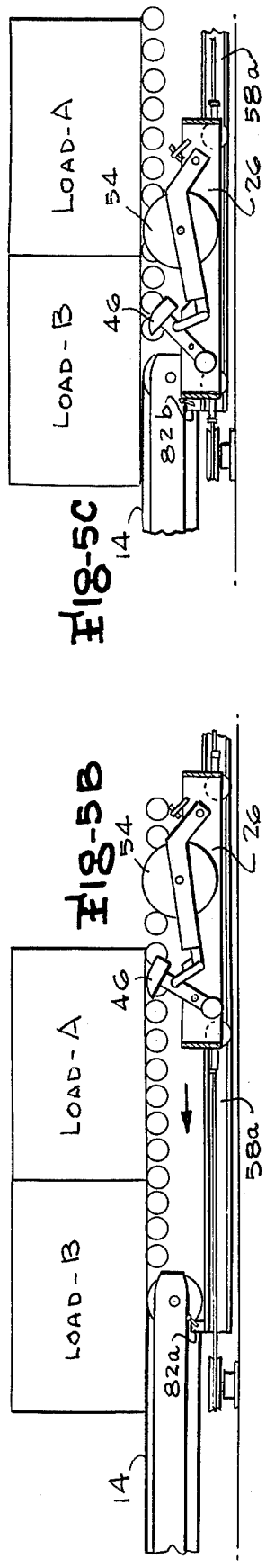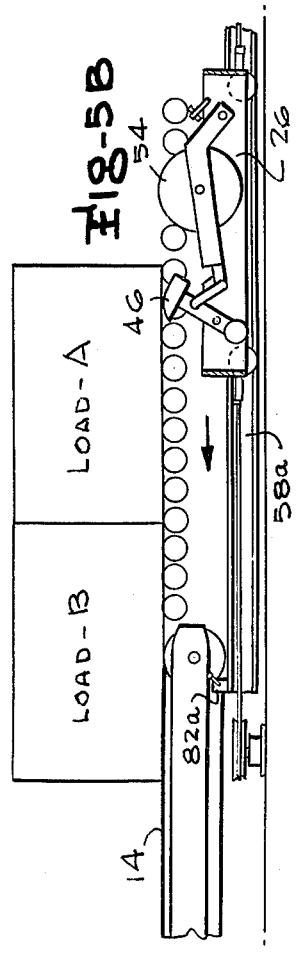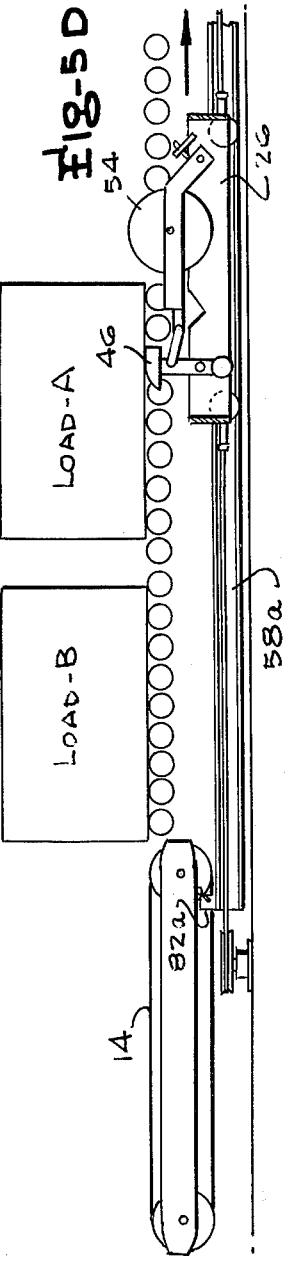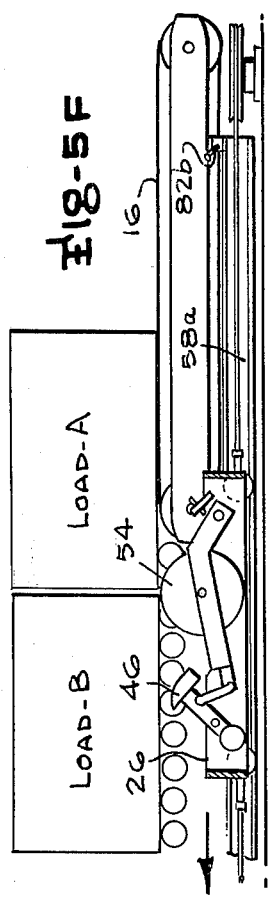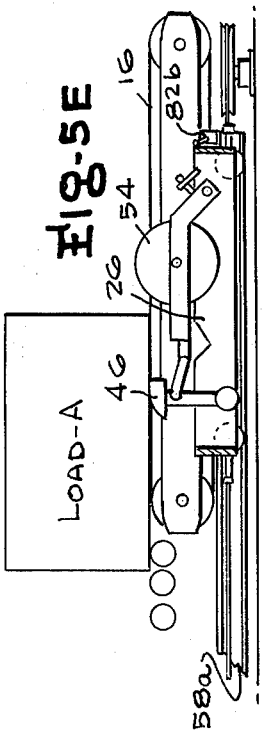

MONITOR CAR TRANSPORTATION AND STORAGE CONVEYOR SYSTEM

BACKGROUND AND OBJECTS OF THE INVENTION

The present invention relates in general to roller conveyor systems, and more particularly to load transporting and storing conveyor systems formed of non-powered conveyor rollers and a load advancing car, or monitor car, which engages and advances loads along the non-powered conveyor rollers from a feed end to an unloading end and senses the positions of loads already advanced to the unloading end to automatically position later transported loads in predetermined closely spaced relation thereto.

Heretofore, powered conveyor roller systems have been in wide use for transporting loads along a conveyance path from an infeed end or loading station to a discharge or unloading end, wherein the loads to be transported rest on the powered conveyor rollers and are driven by frictional contact with the roller surfaces to advance them to the unloading end of the conveyor path. While these powered conveyor roller load transporting systems have been used in many different industries and arts, the ensuing description will be directed primarily to the use of conveyor systems in advancing loads such as stacks of corrugated paper board or cardboard from a loading or feed station to a discharge or unloading station. For example, the loading or feed station may be located adjacent a corrugating machine or adjacent a transfer car movable along a supply lane, and the discharge or unloading end may be provided with a brake belt or similar mechanism for stopping the load at a position where an operator can unload the cardboard blanks into further processing machinery or onto a transfer car adjacent a line of such machinery. Such powered conveyor roller systems have been used frequently to transport stacks of corrugated paper board from a corrugating machine or corrugator to a brake belt at an unloading position, where an operator manually transfers the cardboard blanks, in stacked subdivisions of sizes convenient for the operator to handle, to a printer-slotter machine, which prints, scores and slots the cardboard blanks for further processing at a mechanical folder or stacker, or the operator may manually load the cardboard to more modern folder-gluer machines which print, slot, fold, glue, count and stack the blanks. The powered roller conveyor systems conventionally used in that application involve a long line of conveyor rollers positioned for rotation about parallel axes disposed transverse to the direction of the conveyor path and journalled in suitable bearing structures so that their axes of rotation lie in a common horizontal plane, frequently spaced about 1 foot above the floor line. The lower surfaces of these driven conveyor rollers are engaged by the upper flight of an endless drive belt having one end trained about an idler drum and the other end about a driven drum driven by a suitable chain and sprocket drive mechanism from a drive motor. The belt is usually trained back and forth about a plurality of tensioning drums or pulleys to control the belt tension. Customarily, a plurality of serially arranged zone control tension roll sections underlie the drive belt and are each formed of a plurality of rolls journalled in a vertically movable frame of some chosen length. These zone control sections are located in series along the whole length of the conveyor roll path and bear upwardly against the upper flight of the drive belt to ensure driving friction between the driving belt and the conveyor rollers when adjusted to their raised positions so that the conveyor rollers above them are driven to advance the load from the feed end to the discharge end. Air bags or other vertically adjustable mechanisms are provided to support the opposite ends of each zone control tension roll section and are controlled by signals or mechanisms slaved to a photocell monitoring system to lower selected zone control roll frames and thereby terminate the driving of the conveyor rollers associated with that frame when it is desired to terminate advancing of the load on the rollers above that frame. Typically, a photocell monitoring system is provided a short distance back of the discharge end of the conveyor system, for example, about three feet upstream from the discharge end, to sense the arrival of a stack of blanks or other load at that location and activate the control mechanism for the last downstream zone control roll section to withdraw the driving force from the conveyor rollers supporting the stack which has arrived at the discharge end. Typically, other photocell monitoring units are provided spaced at intervals of about fifteen or twenty feet upstream from the monitoring station at the discharge end to detect arrival of other stacks of blanks or load at the spaced upstream monitoring positions to withdraw the drive from the belt to the conveyor roller at the upstream monitoring stations and stop the subsequent loads at those stations by lowering the associated zone control roll frame section.

A number of disadvantages have been recognized in connection with such powered live roller accumulating conveyor systems. For example, because of the sectioned tension roller type of construction employed and the customary disposition of monitoring photocells, accumulation of load stacks on the conveyor line is severely limited as, for example, when one stack has been advanced to the unloading or discharge end of the conveyor and is being stored at the unloading end, the leading edge of the next load stack to be advanced along the conveyor and stored thereon cannot be nearer to the leading edge of the unloading end stack than the distance between the first and second monitoring photocells along the path, which is usually about fifteen or twenty feet. Even with a closer spacing of monitoring photocells, with a consequent significant increase in cost of installation, the percent storage which can be achieved with such a powered live roller conveyor line is limited to the sectional tension roll construction, since subsequent load stacks to be stored can be brought no closer to the previously advanced stack than the adjoining tension roll section, and such sections are customarily at least 5 feet long.

Also, if a customer desires to lengthen such a powered live roller accumulating conveyor system already installed on his premises, and desires to continue the capacity to accumulate plural load stacks along the conveyor at the respective photocell monitoring stations, he would have to increase the drive motor power requirements for the lengthened line, thus greatly increasing the cost beyond the mere installation of additional conveyor rollers and tension sections.

An object of the present invention, therefore, is the provision of a novel non-powered roller conveyor for transmitting loads between a feed end and an unloading end, wherein a load monitoring transporting car is provided driven by a reversible drive system to move between the two ends for advancing loads along the conveyor line and for sensing where adjacent load stacks at the unloading end are located and to advance successive load stacks to storage positions so closely adjacent to the already advancing load as to obtain close to one hundred percent storage capacity on the conveyor.

Another object of the present invention is the provision of a non-powered conveyor system of the type described in the immediately preceding paragraph, wherein the monitoring car is provided with a movable friction pad and controlled by a mechanism which senses the presence of a load in certain zones relative to the pad to advance the pad into contact with the underside of the load and pull the load along the conveyor line to a position closely adjacent to the last previously advanced stack and thereupon release the load for storage thereat.

Yet another object of the present invention is the provision of a non-powered roller conveyor system of the type having a load sensing monitor car for advancing the load along the conveyor system to storage position, which provides maximum storage accumulation of loads along the roller conveyor line with very small spacing between load sections, which automatically sense the position of the previously advanced load already in storage regardless of the horizontal dimensions of the load stack to deposit the next advanced load stack closely adjacent to the previously advanced stack, and wherein conveyor lines can be readily lengthened without increasing driver power since the monitor car advances only one stack at a time.

Another object of the present invention is the provision of a non-powered roller conveyor system of the type described in any of the three immediately preceding paragraphs, wherein installation costs for relatively long accumulating roller conveyor lines beyond a certain short line size are significantly more economical than conventional powered live roller conveyor systems.

Other objects, advantages and capabilities in the present invention will become apparent in the following detailed description, taken in conjunction with the accompanying drawings illustrating the preferred embodiment of the invention.

BRIEF DESCRIPTION OF THE FIGURES

FIG. 3 is a fragmentary longitudinal vertical section view, taken along the line 3—3 of FIG. 2;

FIG. 4 is a vertical transverse section view taken along the line 4—4 of FIG. 3; and FIGS. 5A to 5F are somewhat diagrammatic views illustrating the action of the monitor car and non-powered rollers of the conveyor system in advancing successive load stacks from an infeed belt station to a brake belt station in a typical installation.

DETAILED DESCRIPTION OF A PREFERRED EMBODIMENT

Figure 1:
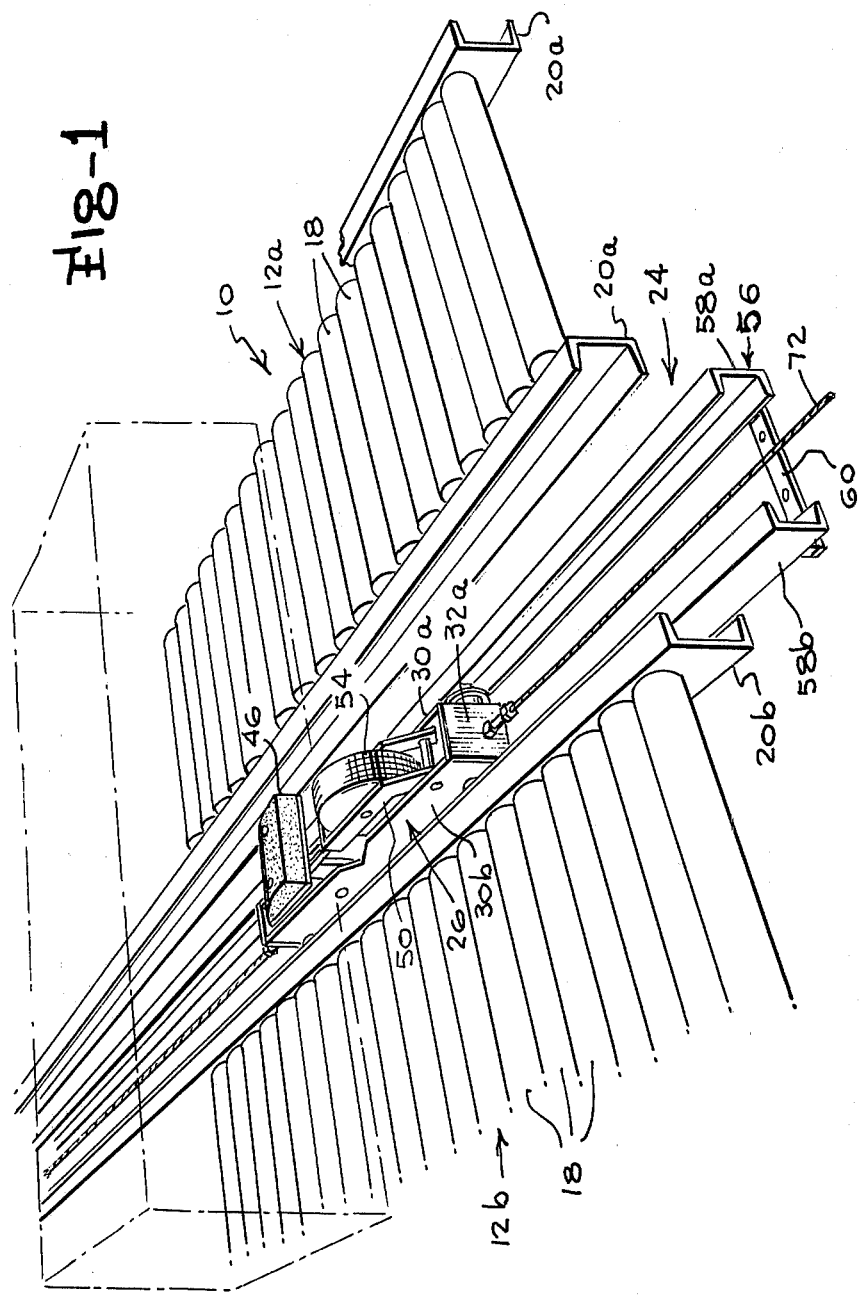
FIG. 1 is a fragmentary perspective view of a portion of a non-powered roller conveyor and monitor car system embodying the present invention, illustrating the relationship of the car and conveyor rollers to a typical load stack.

Referring to the drawings, wherein like reference characters designate corresponding parts throughout the several figures, the non-powered roller conveyor system 10 of the present invention comprises a pair of laterally spaced lines of non-powered conveyor rollers, indicated at 12a, 12b, extending along parallel rectilinear paths between a feed or loading station, which may be defined by a pair of conventional infeed belts 14, and an unloading or discharge station at which may be provided a pair of brake belts 16. The two laterally spaced lines of non-powered conveyor rollers are formed of a large number of parallel cylindrical rollers 18, which are normally about 24 inches in axial length and are arranged with all of their axes disposed in a horizontal plane at or near the floor level of the plant in which they are installed. In the illustrated example, the cylindrical rollers 18 forming the lines of non-powered rollers 12a and 12b have short shaft end portions projecting from the opposite ends of the larger diameter cylindrical roller body 18, formed either by stub shafts or by the ends of center shafts extending through the roller bodies. The shaft portions are journalled in conventional bearings mounted in elongated frame members, such as the channel frame members 20a and 20b shown in the drawings, which in the illustrated embodiment are supported about 12 inches above floor level by vertical support members 22 located at suitable spaced intervals along the length of the conveyor line.

Between the two lines of non-powered rollers 12a, 12b is an elongated upwardly opening channel 24 extending the length of the conveyor line of suitable size to accommodate a load transferring car, indicated by the reference character 26, which we refer to as a "monitor" car. The monitor car has a main frame or body 28 formed of a pair of elongated longitudinal side plates 30a, 30b secured to a pair of transverse end plates 32a, 32b, for example by vertically spaced bolts, and having a pair of wheel axles 34a, 34b extending transversely therethrough welded to the side plates, for example, at the inside surface of the side plates, and having wheels 36 journalled on the axles by suitable bearings.

Located between the two side plates 30a, 30b of the transfer car main frame 28 is a drag shoe and monitor roller mechanism comprising a shoe arm 38 pivoted intermediate its opposite ends on a pivot shaft 40 spanning the distance between the two side plates and extending through openings therein, for example, forming journal openings for the pivot shaft 40. The pivot shaft may be welded to the shoe arm 38 through which it extends and may have spacer sleeves surrounding the portions of the shaft extending between the shoe arm 38 and the side plates, or the pivot shaft 40 may be welded to the side plates and journalled in a spacer sleeve which extends through and is welded to the shoe arm. The lower end of the shoe arm 38 below the axis of the pivot shaft 40 carries a counterweight member 42 and the upper end of the shoe arm 38 has a shoe plate 44 fixed thereto which spans a transverse distance somewhat greater than the width of the body frame 28. A spring may also be connected, if desired, between the lower end portion of arm 38 and the main frame to urge the arm 38 in a clockwise direction, as viewed in FIG. 3. The shoe plate 44 has a friction shoe or friction pad 46 thereon formed of a resiliently deformable friction material, for example, foam rubber or the like, adapted to contact the underside of the load and draw the load along with the monitor car under certain conditions to be hereinafter described.

Also located between the side plates and coupled to the shoe arm 38 is a monitor arm and link mechanism comprising a connecting link 48 pivotally coupled at one end to the shoe arm 38 and at the other end to a roller supporting arm 50 in the form of an elongated angular member pivotally connected at its end remote from the link 48 by pivot shaft 52 to the side plates 30a, 30b and carrying the large monitor roller or actuator wheel 54 in its midregion.

The monitor car 26, in the illustrated embodiment, is driven back and forth through its advance stroke and return stroke along a channel track system 56 located substantially at floor level between the vertical supports 22 of the two conveyor lines 12a, 12b and extending from the feed station at infeed belts 14 to the discharge or unloading station at brake belt 16. The track system 56 comprises a pair of inwardly opening or confronting channel beams 58a, 58b arranged as illustrated in FIG. 4, rigidly supported in an appropriate laterally spaced relation by support members 60 at spaced intervals along the track system and having their side flanges disposed horizontally and spaced apart vertically a distance slightly greater than the diameter of the constricted portions of the wheels 36 to receive the smaller diameter portions of the wheels in nested relation between the channel flanges while the larger diameter wheel rims lie just inwardly of the edges of the channel flanges.

Figure 2:
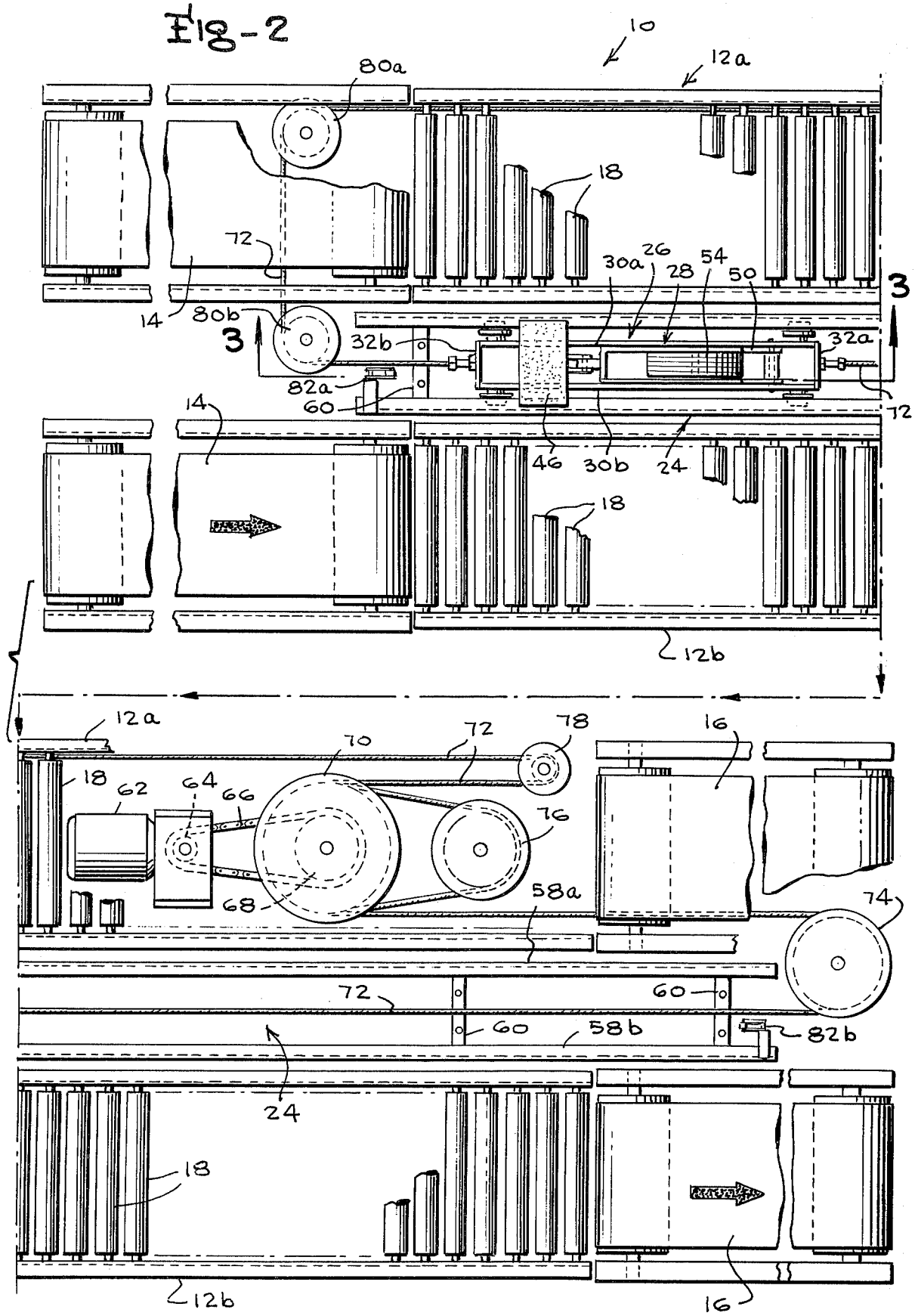
FIG. 2 is a top plan view of the non-powered roller conveyor and monitoring car system, with parts broken away to illustrate the endless belt drive frame for the monitor car.

The monitor car 26 is driven along the track system 56 by a system of sheaves, cable and gear motor as shown in FIG. 2. As illustrated in FIG. 2, an example of a satisfactory drive system for the monitor car 26 may comprise a geat motor 62 of the vertical shaft type having a drive sprocket 64 coupled by a roller chain 66 with a driven sprocket 68 fastened to a drive sheave 70 of the type having two separate grooves which allows the cable 72 to wrap a full 360°. The cable 72 is anchored at one end to the end plate 32a of the monitor car body or main frame and extends centrally along the track system 56 between the track members 58a, 58b to a location just beyond the unloading end of the track system, where the cable executes a 180° wrap about the idler sheave 74 and progresses to the drive sheave 70 where the cable executes a 180° wrap in the top groove of drive sheave 70, passes onto the transition sheave 76, and returns to the bottom groove of the drive sheave 70 to wrap another 180° and exit to the idler sheave 78. The sheaves 70, 76 and 78 as well as the drive motor and chain and sprocket system may be conveniently located below the set of rollers forming one of the two roller lines, for example, the roller line 12a. The cable after passage about the idler shave 78 then extends to a location beneath one of the infeed belts, where it passes about the two return idler sheaves 80a, 80b and is anchored to the end plate 32b of the monitor car. The travel of the monitor car is controlled as it moves from one end of the track system 56 to the other by two limit switches 82a, 82b fixed at the opposite ends of the track. The limit switches 82a, 82b are coupled in conventional manner to the supply for the reversible drive motor 62 to reverse the drive direction when the car reaches an end of the track and trips one of the switches 82a, 82b.

The operation of the non-powered roller conveyor system with the reversible center monitor car or load advancing car will be apparent from the following description of a typical loading sequence having reference to FIGS. 5A–5F.

FIG. 5A illustrates a typical loading condition using the roller conveyor system of the present invention, wherein a pair of loads A and B, for example stacks of paper board or cardboard, have been successively loaded onto the infeed belts 14 by the operator and the rotation of the infeed belts in a feeding direction to the right, as viewed in the figures, moves the load A partially onto the rollers, and the load B, when it is placed on the infeed belt, is advanced to abut against the load A and the loads A and B are pushed out onto the rollers. The position of the friction pad or shoe 46 when the friction pad arm 38 is in the vertical position is such that the friction pad extends slightly above the plane of the top of the roller 18, and in this position, the monitor wheel or actuator wheel 54 also projects slightly above the top of the friction pad 46. The amount of projection of the wheel 54 above the roller level and friction pad may be regulated by a screw type adjustment stop such as shown at 50a in FIG. 3. When the friction pad is rotated forwardly or to the right, as will be later described, such as caused by being drawn under a load, whereby the uppermost surface of the friction pad 46 and the top of the rolls 18 are at the same elevation, the monitor wheel 54 extends slightly above the top of the rolls 18. When the monitor wheel or actuator wheel 54 and the top of the rolls are exactly at the same elevation, the upper surface of the friction pad 46 is spaced slightly below the top of the conveyor rolls 18 and free from contact with any loads.

When the monitor car 26 is drawn to the left, as viewed in FIG. 5B, a sufficient distance to bring the friction pad 46 into contact with the lower leading corner of load A, the contoured surface of the friction pad allows it to rotate forward or to the right as viewed in FIG. 5B, and under the load as it makes contact with the load. As the monitor wheel 54 then reaches the lower right-hand corner of the load A during continued leftward or return stroke travel of the monitor car, the monitor wheel or actuator wheel 54 is depressed by contact with the load, rotating the friction pad 46 out of contact with the load, and the actuator wheel rolls freely under the load without having any effect on the load.

As the monitor car reaches the return or left-hand end of the track system, the limit switch 82a is tripped, reversing the direction of the monitor car travel. As the monitor car travels forward or to the right through the initial portion of its advance stroke, the friction pad or shoe 46 remains depressed out of contact with the load so long as the monitor wheel 54 is bearing against the bottom surface of load A and load B. However, at the point the monitor wheel 54 rolls out from under the load A, the friction pad arm 38, which is counterweighted at the bottom, rotates counterclockwise towards a more vertical position and the friction pad makes contact with the bottom surface of the load A. The friction between load A and the friction pad 46 causes the friction pad arm 38 to rotate to a vertical, stopped position. In this position, the friction pad 46 has a slight elevating or picking up effect on the load, thus allowing the car to drive or drag the load along the roller conveyor system toward the brake belt, as depicted in FIG. 5D.

When the monitor car 26 reaches the right-hand end position at the end of its advance stroke, it trips the limit switch 82b, again reversing the direction of drive of the reversible motor 62 causing the monitor car to be retracted to the left. At the time this reversal takes place, the load A has been drawn onto the brake belt 16, and the movement of the monitor car towards the left causes the same action depicted in FIG. 5B where the frictional engagement between the friction pad or shoe 46 and the load causes the friction shoe arm 38 to rotate clockwise and lower the friction shoe enough so that it slides in a return direction in contact with the bottom surface the load A until the monitor wheel 54 engages the load A, whereupon the friction pad arm is rotated to depress the friction pad 46 further out of contact with the bottom of the load and the monitor car returns to the left end limit position, engaging the load B and moving underneath the load until it reaches the limit position, having the same action as described in connection with FIG. 5B upon engagement with the load. Upon reversal of the car travel direction so that it moves again in the forward or advance stroke direction, the actuator wheel rolls along the bottom of the load B until it rolls out from under the load, whereupon the friction pad arm 38 rotates toward the vertical again to raise the friction pad 46 into contact with the bottom of the load B to pick up the load B in the same manner as the car picked up the load A, and drive it toward the brake belt. As the load B approaches the load A, the monitor wheel or actuator wheel 54 contacts and is actuated by engagement with the load A at the unloading position, depressing the actuator wheel 54 and thus shifting the friction pad shoe 46 downward out of contact with the load B to leave the load B immediately adjacent to the load A at the brake belt end, as illustrated in FIG. 5F. The monitor car can then return through its return stroke to the infeed belt position and repeat this sequence with additional loads until loads are stored on the entire roller conveyor line. When the brake belt drive is actuated by the operator to advance the load A to deliver it to the processing machinery served by the conveyor system, the monitor car will drive the load B onto the brake belt at the next interval or return and advance sequence.

It will be apparent that the monitor car and nonpowered conveyor roller system herein described provides an efficient load advancing and storing system wherein the loads can be stored closely adjacent to each other to occupy substantially the entire length of the conveyor and which may be built to various lengths without changing the power requirements of the drive mechanisms. The unique capacity of the monitor car with the monitoring or actuating wheel 54 provides the capacity to sense the location of loads which have been previously advanced to the brake belt or unloading position, and effect automatic operation of the friction pad shoe which is dragging subsequent loads toward the unloading position to terminate advancing of the subsequent load when the monitor wheel contact the prior, already advanced load and thereby automatically positions subsequent loads immediately adjacent to the previously advanced loads.

What is claimed is:

1. A roller conveyor of the non-powered roller type for transporting loads between a loading station and an unloading station and for storing a plurality of such loads thereon in closely adjacent serial relation, comprising means defining a roller conveyor line paralleling a conveyance path between said stations, the conveyor line comprising a plurality of rollers disposed for rotation about parallel transverse axes perpendicular to the conveyance path in a substantially horizontal plane for travel and storage of loads along the line of rollers, track means disposed adjacent the roller conveyor line defining a trackway extending the length of the conveyor line, a wheeled load-advancing monitor car guided by said track means for reciprocative movement along advance and return strokes between said stations, said monitor car having a main frame located below a reference level defined by the level of the upper surfaces of the conveyor rollers and a friction pad shoe extending thereabove supported for movement between a lower retracted position below said reference level and below any loads on the rollers and an upper active position slightly above said reference level to engage the bottom of loads on said rollers and advance them toward said unloading station, a load-engaging wheel supported on a movable arm carried by the car and coupled to the friction pad shoe to control the position of the shoe, means normally urging said arm and load-engaging wheel to a position extending slightly above said reference level and spaced toward the unloading station from said shoe to engage the bottom portions of any loads in the path of movement of the uppermost portion of said wheel causing the latter to be depressed thereby for activating the shoe to retract the shoe from contact with any load thereabove, whereby engagement of the wheel with loads being stored at positions in an advancing direction relative to the car effects retraction of the shoe from advancing contact with any load being currently advanced thereby to leave the latter space closely adjacent the load engaged by the wheel a distance determined by the spacing between said wheel and shoe, and reversible drive means for driving said monitor car through said advance and return strokes.

2. A roller conveyor of the non-powered roller type as defined in claim 1, wherein said friction pad shoe is supported on a pivoted arm carried by the monitor car and normally urged to an upright position.

3. A roller conveyor of the non-powered roller type as defined in claim 2, wherein said load-engaging wheel is supported on a movable lever pivoted to the main frame of the car and linked to the pivoted arm supporting said shoe, said lever being depressed through a sufficient angular distance upon engagement of the wheel with a load to rotate said pivoted arm through a distance retracting the shoe to a position spaced below said reference level.

4. A roller conveyor of the non-powered roller type as defined in claim 1, wherein the conveyor line comprises a pair of laterally spaced sets of conveyor rollers extending transversely of the conveyance path and aligned along a pair of laterally spaced rectilinear axes, said track means being disposed in recessed relation between and below the two laterally spaced sets of rollers and said load-advancing monitor car being disposed therebetween guided by said track means.

5. A roller conveyor of the non-powered roller type as defined in claim 3, wherein the conveyor line comprises a pair of laterally spaced sets of conveyor rollers extending transversely of the conveyance path and aligned along a pair of laterally spaced rectilinear axes, said track means being disposed in recessed relation between and below the two laterally spaced sets of rollers and said load-advancing monitor car being disposed therebetween guided by said track means.

6. A roller conveyor of the non-powered roller type as defined in claim 1, wherein the load-engaging wheel and its supporting arm and the means urging the same to raised position and the coupling thereof with said shoe form shoe positioning means causing the shoe to be retracted below said reference level out of load-engaging position by engagement of said wheel with a load during return stroke movement of the car and causing the shoe to rise into load advancing contact with the bottom of a load unit thereabove immediately upon passage of the wheel out of engagement with the load unit during advance stroke movement of the monitor car.

7. A roller conveyor of the non-powered roller type as defined in claim 3, wherein the load-engaging wheel and its supporting arm and the means urging the same to raised position and the coupling thereof with said shoe form shoe positioning means causing the shoe to be retracted below said reference level out of load-engaging position by engagement of said wheel with a load during return stroke movement of the car and causing the shoe to rise into load advancing contact with the bottom of a load unit thereabove immediately upon passage of the wheel out of engagement with the load unit during advance stroke movement of the monitor car.

8. A roller conveyor of the non-powered roller type for transporting loads between a loading station and an unloading station and for storing a plurality of such loads thereon in closely adjacent serial relation, comprising a laterally spaced pair of roller conveyor lines extending parallel to a conveyance path between said stations, each conveyor line comprising a plurality of rollers disposed for rotation about parallel transverse axes perpendicular to the conveyance path in a substantial horizontal plane for travel and storage of loads along the lines of rollers, track means disposed between the pair of roller conveyor lines defining a trackway extending the length of the lines, a wheeled load advancing monitor car guided by said track means for reciprocative movement along advance and return strokes between said stations, said monitor car having a friction pad shoe supported on a pivoted shoe supporting arm for movement between a lower retracted position below a reference level defined by the level of the upper surfaces of the conveyor rollers spaced below any loads on the rollers and an upper active position slightly above said reference level to engage the bottom loads on said rollers and advance them toward said unloading station, shoe positioning means including a load engaging wheel supported on a movable lever pivoted on the car and linked to the shoe supporting arm to control the position of the shoe, means normally urging said lever and wheel to a position extending slightly above said reference level and spaced toward the unloading station from said shoe to engage the bottom portions of the last of any loads already advanced toward the unloading end still supported on said rollers and be depressed thereby for activating the shoe support arm to retract the shoe from advancing contact with any load being currently advanced thereby and leave the latter spaced closely adjacent the load engaged by the roller a distance determined by the spacing between said wheel and shoe, said shoe positioning means causing the shoe to be retracted below said reference level out of load engaging position by engagement of said wheel with a load during return stroke movement of the car and causing the shoe to rise into load advancing contact with the bottom of a load unit thereabove immediately upon passage of the wheel out of engagement with said load unit during advance stroke movement of the monitor car, and reversible drive means for driving the car through its advance and return strokes.

9. A roller conveyor of the non-powered roller type as defined in claim 8, wherein said monitor car has a wheeled main frame located below said reference level between said conveyor lines, and said reversible drive means including a cable connected at its ends to opposite ends of said car and coupled to a reversible electric motor, and said track means including limit switches at the opposite ends of the track for reversing the direction of drive of said reversible motor.

10. A roller conveyor of the non-powered roller type as defined in claim 8, wherein said pivoted shoe supporting arm includes a portion extending below the pivot axis thereof having counterweight means thereon exerting gravitational forces tending to normally rotate said lever to a vertical position disposing said pad above said reference plane.

11. A roller conveyor of the non-powered roller type as defined in claim 1, wherein said reversible drive means includes a cable connected at its ends to opposite ends of said car and coupled to a reversible electric motor, and said track means includes limit switches at the opposite ends of the track for reversing the direction of drive of said reversible motor.

12. A roller conveyor of the non-powered roller type as defined in claim 3, wherein said reversible drive means includes a cable connected at its ends to opposite ends of said car and coupled to a reversible electric motor, and said track means includes limit switches at the opposite ends of the track for reversing the direction of drive of said reversible motor.

13. A roller conveyor of the non-powered roller type as defined in claim 1, wherein said pivoted shoe supporting arm includes a portion extending below the pivot axis thereof having counterweight means thereon exerting gravitational forces tending to normally rotate said lever to a vertical position disposing said pad above said reference plane.

14. A roller conveyor of the non-powered roller type defined in claim 12, wherein said pivoted shoe supporting arm includes a portion extending below the pivot axis thereof having counterweight means thereon exerting gravitational forces tending to normally rotate said lever to a vertical position disposing said pad above said reference plane.

* * * * *